US011231677B2

(12) United States Patent
Quintana et al.

(10) Patent No.: US 11,231,677 B2
(45) Date of Patent: Jan. 25, 2022

(54) ALIGNMENTS OF MEDIA USING MULTIPLE PASSES

(71) Applicant: Hewlett-Packard Development Company, L.P., Spring, TX (US)

(72) Inventors: Jason M Quintana, Vancouver, WA (US); Jay S Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/047,952

(22) PCT Filed: Jun. 22, 2018

(86) PCT No.: PCT/US2018/038930
§ 371 (c)(1),
(2) Date: Oct. 15, 2020

(87) PCT Pub. No.: WO2019/245574
PCT Pub. Date: Dec. 26, 2019

(65) Prior Publication Data
US 2021/0168244 A1  Jun. 3, 2021

(51) Int. Cl.
*G03G 15/00* (2006.01)
*H04N 1/387* (2006.01)
*G06K 15/02* (2006.01)
*H04N 1/00* (2006.01)

(52) U.S. Cl.
CPC ....... *G03G 15/6567* (2013.01); *H04N 1/3878* (2013.01); *G03G 2215/00561* (2013.01); *G06K 15/027* (2013.01); *H04N 1/00037* (2013.01); *H04N 1/00045* (2013.01); *H04N 1/0066* (2013.01); *H04N 1/00087* (2013.01)

(58) Field of Classification Search
CPC combination set(s) only.
See application file for complete search history.

(56) References Cited

U.S. PATENT DOCUMENTS

| 6,257,690 | B1 | 7/2001 | Holstun |
| 6,452,147 | B1 | 9/2002 | Inada |
| 6,486,906 | B1 | 11/2002 | Foster |
| 6,585,341 | B1 | 7/2003 | Walker et al. |
| 7,120,272 | B2 | 10/2006 | Guiguizian |
| 7,706,025 | B2 | 4/2010 | Wang |

(Continued)

FOREIGN PATENT DOCUMENTS

| CN | 1719345 | 1/2006 |
| CN | 1749020 | 3/2006 |

(Continued)

*Primary Examiner* — Barbara D Reinier
(74) *Attorney, Agent, or Firm* — HP Inc. Patent Department

(57) ABSTRACT

An example of apparatus to align media. The apparatus includes a printer assembly to form markings a first side of a media. The apparatus also includes a sensor to detect a backside pattern on each pass at multiple locations. The apparatus includes a processor in communication with the sensor. The processor is to compare the backside pattern measured on multiple passes to determine offset amounts. The apparatus also includes a controller to adjust the media relative to the printer assembly based on the offset values.

15 Claims, 7 Drawing Sheets

(56) References Cited

U.S. PATENT DOCUMENTS

| | | |
|---|---|---|
| 7,967,407 B2 | 6/2011 | Moscato et al. |
| 8,035,093 B2 | 10/2011 | Brumbaugh et al. |
| 8,118,390 B2 | 2/2012 | Pawlik |
| 8,706,017 B2 | 4/2014 | Mizes |
| 8,931,865 B1 | 1/2015 | Duke |
| 9,010,924 B2 | 4/2015 | Leighton et al. |
| 9,950,515 B2 * | 4/2018 | Iida ................ H04N 1/4015 |

FOREIGN PATENT DOCUMENTS

| | | |
|---|---|---|
| CN | 102811863 | 12/2012 |
| CN | 103171314 | 6/2013 |
| CN | 103765820 | 4/2014 |

* cited by examiner

ALIGNMENTS OF MEDIA USING MULTIPLE PASSES

BACKGROUND

Imaging devices, such as printers, form images on media. For example, thermal printing systems may apply heat to thermally reactive media to form images. The thermally reactive media may have colorant embedded in stacked layers and particular temperatures and exposure durations may cause activation of embedded colorants.

BRIEF DESCRIPTION OF THE DRAWINGS

Reference will now be made, by way of example only, to the accompanying drawings in which.

DETAILED DESCRIPTION

Imaging apparatus, such as print systems, may generate output onto media using various means. It some examples, a print system may use a thermal printing method where heat is applied to a media. In other examples, heat may be used to transfer colorant to media, or colorant may ejected with inkjet, or in some cases, colorant is first applied to a drum or belt and then fused to the media. Accordingly, print systems may involve moving a media relative to a printer assembly such that the printer assembly may mark a surface of the media. In some applications, the printer assembly may make several passes over the media to improve the quality of the markings on the media, such as improving the color gamut. For example, each pass may involve a different portion of the printer assembly 55, such as a different print head when printing with multiple print heads is not feasible. Alternatively, a second pass may be used to add further contrast by enhancing the marking of the first pass. However, multiple passes over a media by a printer assembly may result in reduced marking quality due to misalignment of the media on the second pass. The cause of the misalignment may not be particularly limited. For example, misalignment may be introduced by slippage between the media and a feed system, blacklash, and/or transferring gears in the feed system.

Figure 1:
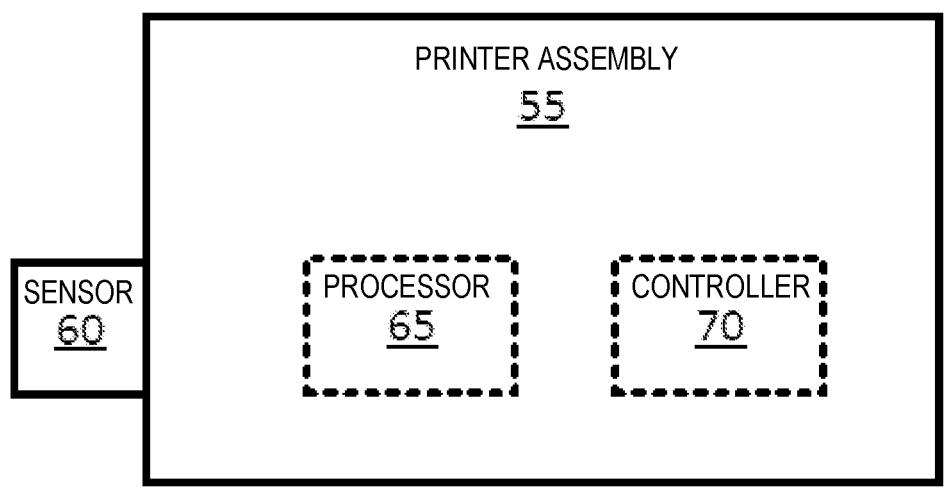
FIG. 1 is a block diagram of an apparatus to align media passing through a printer assembly.
Figure 1:

Referring to FIG. 1, an apparatus is generally shown at 50. The apparatus 50 is to align media 100 passing through a printer assembly multiple times to provide multiple passes for marking the media 100 on a front side 110. In the present example, the apparatus 50 includes a printer assembly 55, a sensor 60, a processor 65, and a controller 70.

The printer assembly 55 is to form markings on a media 100. For example, the markings may be formed based on content data received from another computing device. The printer assembly 55 is not particularly limited and may include any assembly form markings on a media 100. For example, the printer assembly 55 may include a thermal printing system or an inkjet system, where multiple passes may be made over the media 100 to enhance the quality of the markings. The media 100 is also not particularly limited and may be dependent on the printer assembly 55 and the manner by which is forms the markings. For example, the media 100 may be regular paper for inkjet systems and may thermal sensitive paper for thermal printing systems.

In the present example, the media 100 on which the markings are formed include a backside pattern on the backside 105 of the media 100. The backside 105 of the media 100 is the opposite side from the side on which the markings are to be formed. The backside pattern is not particularly limited and may cover substantially the entire backside 105 of the media 100. In some examples, the backside pattern may include evenly space line pairs.

In other examples, the backside pattern may appear at discrete locations distributed on the backside 105 of the media 100. It is to be appreciated that the distribution of the backside pattern may be varied and may not be a fixed pattern. In examples with a backside pattern at discrete locations, the backside pattern may be distributed evenly on the backside 105 of the media 100 or proximate to opposite ends of the media 100 such that alignments may be carried out at various locations on the media 100 to provide an improved match of the second pass relative to the first pass.

The backside pattern may be uniform or random. For example, the backside pattern may include line pairs, such as a plurality of parallel lines across the width of the backside 105 of the media 100 to be matched. The backside pattern may be unknown prior to feeding the media 100 into the printer assembly 55. For example, the backside pattern may be different for each sheet of media. In some examples, the backside pattern may be the natural imperfection pattern of the media 100, such as the orientation of various fibers of paper media. In further examples, the backside pattern may include an embedded logo for branding, a machine-readable digital watermark, a QR code, various line patterns, color coded features, or varying ink density to provide various pattern densities.

Figure 2A:
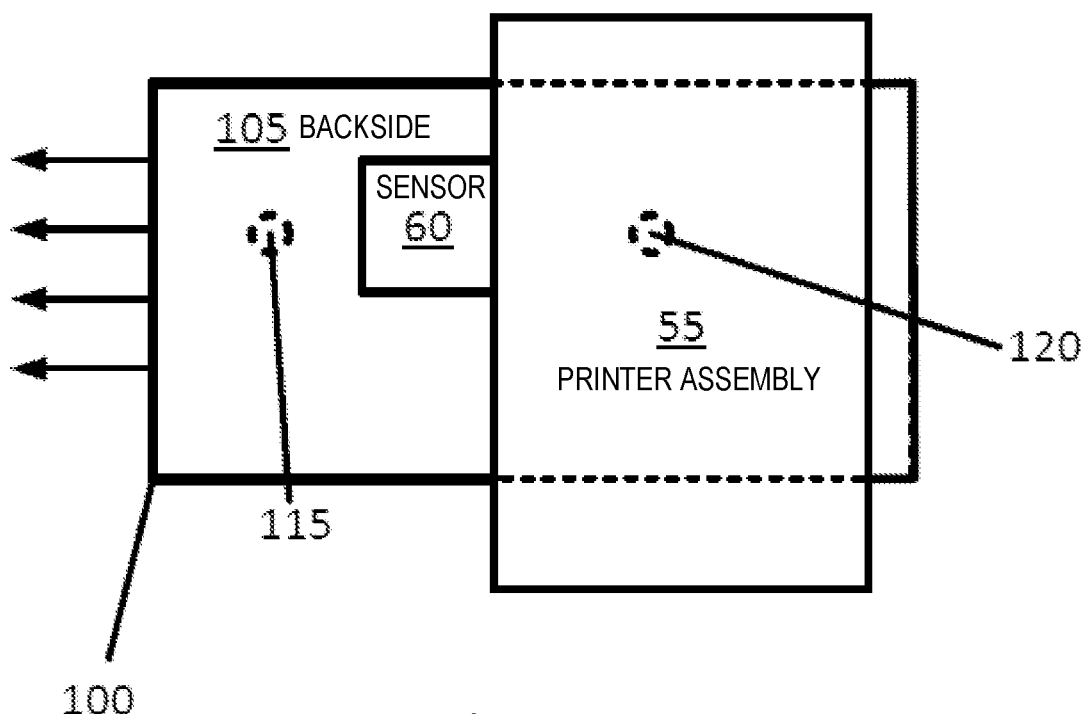
FIGS. 2A-B are top view diagrams of the apparatus showing (a) an example where measurements are made at two locations; and (b) an example where measurements are made continuously.

The sensor 60 is to detect a backside pattern on the backside 105 of the media 100. Referring to FIG. 2A, the sensor 60 is to detect the backside pattern at a location 115 and at another location 120 during each pass of the media 100 through the printer assembly 55. The precise position of the location 115 and the location 120 is not particularly limited. In some examples, the location 115 and the location 120 may be spaced about a third of the length of the media 100 apart and centered on the media 100 such that each of the location 115 and the location 120 are equal distance from each other as they are from an end along the length of the media 100. Although the present example forms markings along the length of the media 100 as shown in FIG. 2A, it is to be appreciated that in some examples, markings may be formed by moving the media 100 width-wise. In such examples, the location 115 and the location 120 may be spaced about a third of the width of the media 100 apart and centered on the media 100 such that each of the location 115 and the location 120 are equal distance from each other as they are from an end along the width of the media 100

The manner by which the sensor 60 detects the backside pattern is not particularly limited. In the present example, the sensor 60 may include a light source and a detector. The light source is not limited and may be a filament light source, a light emitting diode, or a laser. In some examples, the light source may include various mirrors and optical lenses to focus light onto the backside 105 of the media 100. The detector may measure the light reflected off the backside 105 of the media 100. The manner by which the reflected light is measured is not particularly limited. For example, the sensor 60 may include a photodiode to measure the varying intensity of light reflected off the backside 105 of the media 100. In other examples, the sensor 60 may not include a light source and use the reflection of ambient light. In further examples, the sensor 60 may not detect light and instead may be to detect other types of markings, such as magnetic markings or thermally sensitive markings.

Figure 2B:
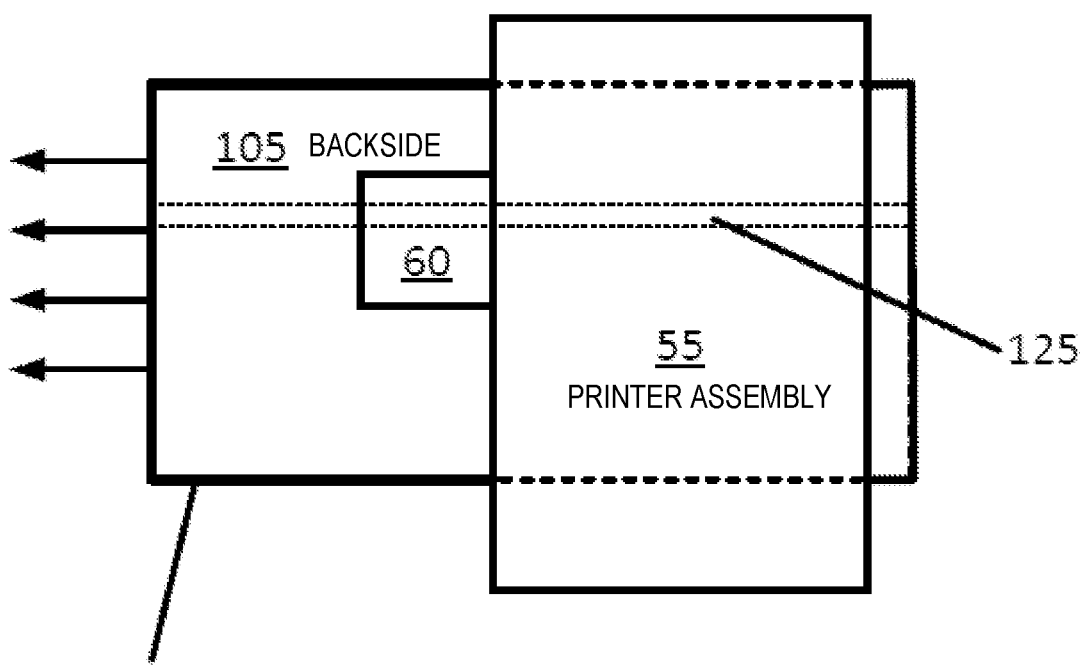

Referring to FIG. 2B, another example of the operation of the sensor 60 is illustrated. In this example, the sensor 60 operates continuously along the media 100 to detect the backside pattern. In such examples, the sensor 60 may collect data continuously such that a plot of the intensity of light along the length of the media 100 may be generated. In the present example, the sensor 60 may measure the light response as media 100 is moved over the sensor 60. Accordingly, the light response within the window 125 may be measured. In the present example, the window 125 is about 2 mm wide running substantially along the entire backside 105 of the media. In other examples, the width may be narrower or wider. It is to be appreciated that by making the window 125 wider, a larger light response may be measured, but additional averaging may occur. The additional averaging may reduce the accuracy of the light response measured along the media 100 making matching more difficult as explained in greater detail below.

Figure 3:
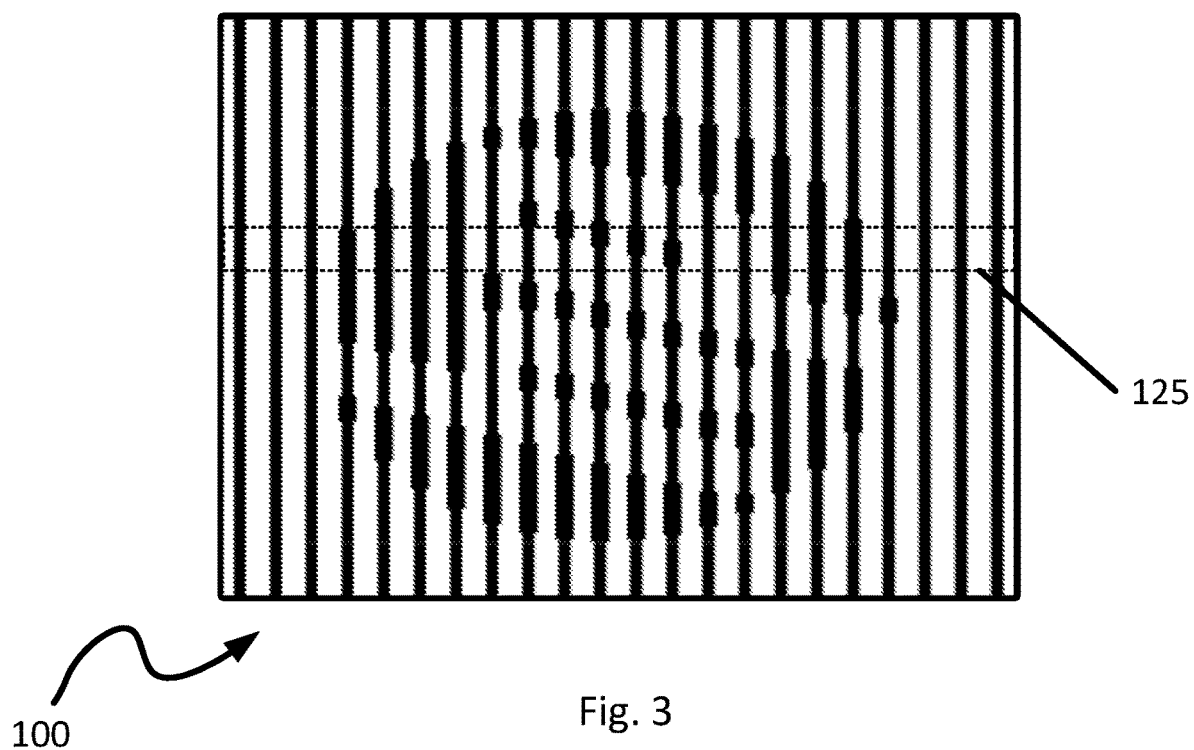
FIG. 3 is an example of a backside pattern.

Referring to FIG. 3, the backside 105 of a media 100 is illustrated. In this example, the backside pattern comprises a plurality of paired lines spaced approximately equally apart. In addition, the thickness of the lines is varied in specific locations to provide an embedded image on the backside 105 of the media 100. It is to be appreciated that by embedding an image, a manufacturer of the media 100 may use the backside pattern to brand and/or mark the media 100. Accordingly, when the media 100 is fed into the apparatus 50, the window 125 mat represent the area to be detected using the sensor 60 continuously, such as that shown in FIG. 2B, as the media passes through the printer assembly 55.

Figure 4A:
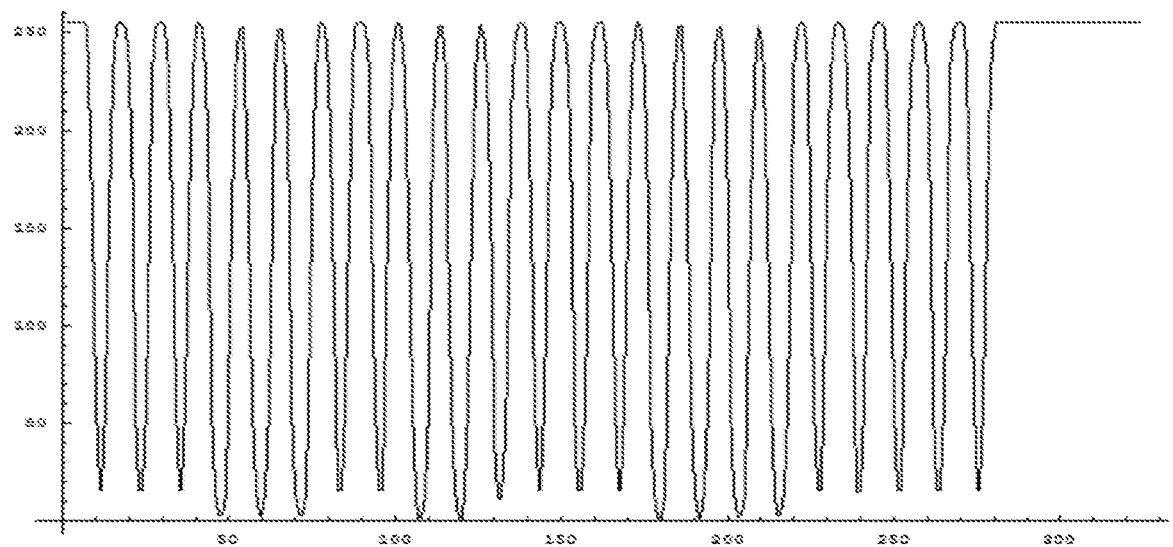
FIGS. 4A-B are signal plots from a sensor of the backside pattern where (a) is the first pass and (b) is a second pass offset from the first pass.

Continuing with this example, FIG. 4A may represent the signal received at the sensor 60 as the media passes through the printer assembly 55. The signal provided by the media 100 is an approximate sinusoidal signal. The amplitude of the signal is greater during certain cycles because of the variation of the width of the lines from FIG. 3 that provide the embedded image. It is to be appreciated that the signal shown in FIG. 4A is a sinusoidal curve due to the characteristics of the sensor 60 and the characteristics of the backside pattern, such as the spacing of the lines and the duty cycle. For example, if the field of view of the sensor 60 is approximately similar to the spacing of lines, the sinusoidal signal shown in FIG. 4A will be provided. In other examples, if the field of view of the sensor 60 is substantially smaller than the spacing of the lines, the signal appear as an approximate square function.

Figure 4B:
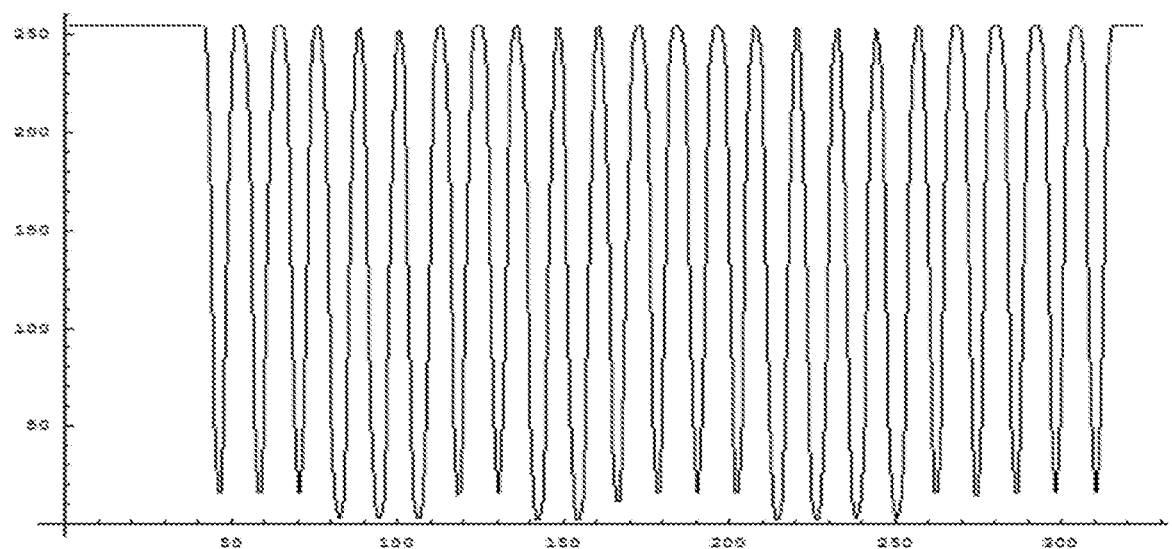

Referring to FIG. 4B, the signal shown may represent a second pass of the media 100 shown in FIG. 3 through the printer assembly 55. It is to be appreciated that the signal shown in FIG. 4B is identical to the signal shown in FIG. 4A with the exception of a shift of approximately 40 sample units. The shift may represent an offset of the media 100 by 40 sample units on the second pass through the printer assembly 55. Accordingly, if the printer assembly 55 is forming marks on the front side 110, a corresponding shift or re-alignment is to be provided so that the markings may be aligned on the second pass. In the present example, each sample unit may represent a distance of offset and the correspondence values may be stored in a table to provide the appropriate amount to shift the media 100 relative to the printer assembly 55 as described in greater detail below.

It is to be appreciated that the backside pattern of the media 100 is not limited. For example, any backside pattern may be used to generate a signal curve as shown in FIG. 4A. For example, the backside pattern may include greyscales and other features that may affect the amount of light received by the sensor 60 to provide a unique signal. Upon subsequent passes of the media 100 over the sensor 60, the signal will be similar after applying a shift or other transformation to account for misalignments or slippage as the media 100 passes through the printer assembly 55.

The processor 65 is in communication with the sensor 60 and is to receive signals from the sensor 60. In the present example, the processor 65 compares the backside pattern of the media 100 measured at a point, such as location 115, with the backside pattern of the media 100 measured during a second pass at the same point. Accordingly, the processor 65 may calculate or determine a relationship, such as an offset between the first pass and the second pass. The processor 65 further compares the backside pattern of the media 100 measured at another point, such as location 120, with the backside pattern of the media 100 measured during a second pass at the same point. Accordingly, the processor 65 may calculate or determine a relationship, such as a second offset between the first pass and the second pass. It is to be appreciated that the offset measured at the location 115 may be different from the offset measured at the location 120. The difference may be due to slippage of the media 100 during the interaction with the printer assembly 55 in either the first pass or the second pass between the location 115 and the location 120. In examples where there is no slippage, it is to be appreciated that the first offset and the second offset are substantially identical.

In the present example, each pass of the media 100 through the printer assembly 55 is carried out in the same direction. Accordingly, the media 100 is brought back to the original start position before a subsequent pass is carried out. In other examples, a subsequent pass may involve the media to be fed into the printer assembly 55 in a reverse direction. In such examples, the processor 65 is to accommodate for the reversal.

In another example, such as where the sensor 60 operates continuously along the media 100 to detect the backside pattern, the processor 65 may compare the backside pattern of the media 100 measured during a first pass, such as the signal shown in FIG. 4A, with the backside pattern of the media 100 measured during a second pass, such as the signal shown in FIG. 4B. In this example, the processor 65 compares the backside pattern of the media 100 to determine or calculate an offset between the first pass and the second pass continuously. In the present example, continuously may mean an offset is calculated at multiple discrete points or locations that are close to each other. Unless the media 100 slips in the interaction with the printer assembly 55, the offset along the entire length of the media 100 is similar.

The processor 65 is not particularly limited. For example, the processor 65 may include a central processing unit (CPU), a microcontroller, a microprocessor, a processing core, a field-programmable gate array (FPGA), or similar. The processor 65 may execute instructions to carry out the functions described above as well as other functions of the printer assembly 55. The instructions may be stored in the processor 65, such in an associated cache, or on a separate non-transitory machine-readable storage medium.

The controller 70 is coupled with the processor 65 and includes any circuitry or combination of circuitry and executable instructions to control the printer assembly 55 or cause an adjustment of an attribute of the printer assembly 55 to correct an offset. In particular, the controller 70 is to adjust the media 100 relative to the printer assembly 55 so that a subsequent pass of the media 100 through the printer assembly 55 may be better aligned such that the markings on the front side 110 will be formed accurately and with higher quality.

The manner by which the controller 70 controls the printer assembly 55 is not particularly limited. For example, in the above example shown in FIG. 2A where two discrete offsets are determined, the controller 70 may translate the media 100 relative to the printer assembly 55 by the calculated offset amount when the media 100 reaches the location associated with the offset. In the above example shown in FIG. 2B where the sensor continuously detects the backside pattern, the controller 70 may adjust the media 100 relative to the printer assembly 55 continuously along the media 100 as it passes through the printer assembly. In other examples, the controller 70 may also alter the timing of the content data provided to the printer assembly 55 such that the formation of the markings on the front side 110 is effectively be offset. Accordingly, instead of offsetting the media 100, the time at which the printer assembly receives the content data is offset to achieve a similar result of translating the markings on front side 110. In addition, adjusting the timing of the content data allows for easier adjustments that use stretch or compression transformations.

The controller 70 is not particularly limited. In the present example, the controller 70 is shown as a separate component, such as in FIG. 1. Accordingly, the controller 70 may be similar to the processor 65 in that the controller 70 may also be a process. Since the processor 65 and the controller 70 may share similar structure and architecture, the processor 65 and the controller 70 may share the same physical hardware, such as a central processing unit, in some examples.

Figure 5:
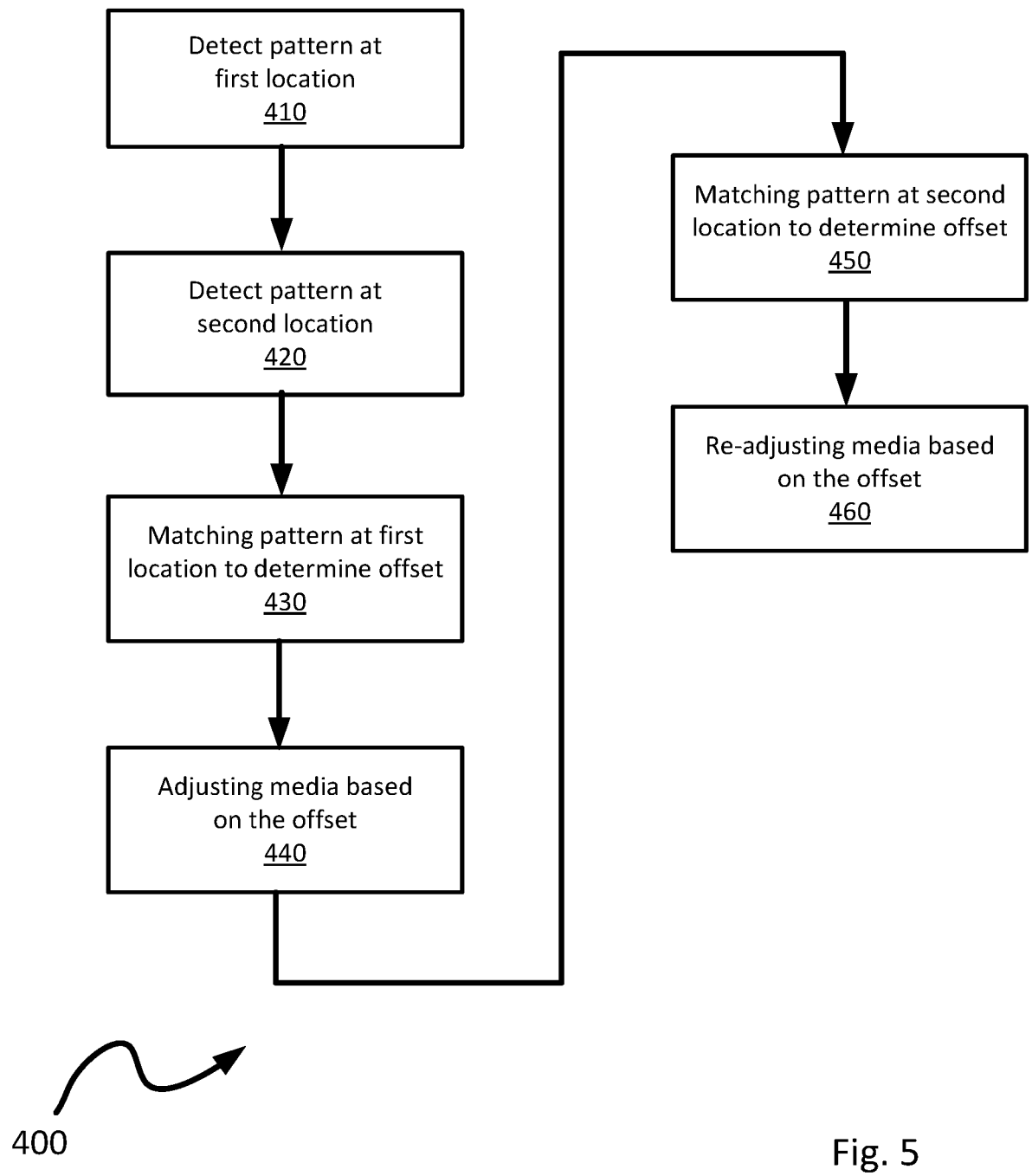
FIG. 5 is a flowchart of an example method of aligning media passing through a printer assembly.

Referring to FIG. 5, a flowchart of a method of aligning a media 100 is shown at 400. In order to assist in the explanation of method 400, it will be assumed that method 400 may be performed with the apparatus 50. Indeed, the method 400 may be one way in which apparatus 50 is used and the following discussion of method 400 may lead to a further understanding of the apparatus 50 along with its various components.

Beginning at block 410, the sensor 60 detects a backside pattern at a location on the backside 105 of a media 100. The manner by which the sensor 60 detects the pattern is not limited and may include various manners. In the present example, the sensor 60 may include a light source and a detector. The light source is not limited and may be a filament light source, a light emitting diode, or a laser. In some examples, the light source may include various mirrors and optical lenses to focus light onto the backside 105 of the media 100. The detector may measure the light reflected off the backside 105 of the media 100. The manner by which the reflected light is measured is not particularly limited. For example, the sensor 60 may include a photodiode to measure the intensity of light. In other examples, the sensor 60 may not include a light source and use the reflection of ambient light.

Next, at block 420, the sensor 60 detects a backside pattern detects the backside pattern at another location on the backside 105 of a media 100. The manner by which the sensor 60 is repositioned to detect the backside pattern at another location is not limited. For example, the sensor 60 may be positioned at a fixed location relative to the printer assembly 55 and the media 100 may be moved through the printer assembly 55 using a feed mechanism (not shown) using mechanical rollers. In other examples, the printer assembly 55 may be moved relative to a stationary media 100, such as along a track system, to form markings on the front side 110 of the media 100.

The location at which the sensor 60 detects the backside pattern in block 410 and the location at which the sensor 60 detects the backside pattern in block 420 is not limited. In the present example, the sensor 60 carries out the detection in block 410 proximate to the leading edge of the media 100 as the printer assembly 55 begins to form markings on the front side 110 of the media 100. The sensor 60 then carries out the detection in block 420 proximate to the midpoint of the media 100 as moves relative to the printer assembly 55 forming markings on the front side 110 of the media 100 during a first pass.

It is to be appreciated that in other examples, locations at which the sensor 60 detects the backside pattern may be varied. For example, sensor 60 may detect the backside pattern at locations that are equal distance from each other as they are from their respective ends along the length of the media 100. These locations may be closer to the location on the front side 110 of the media 100 (i.e. the center) where the markings having more detail are to be formed.

Although the location at which the sensor 60 detects the backside pattern may be modified, it is to be appreciated that once the location on the backside 105 of the media 100 is set, the locations are to be fixed for the operation of the apparatus. Accordingly, the sensor 60 is to detect the backside pattern at approximately the same location for multiple passes of the media 100 through printer assembly 55.

In other examples, the sensor 60 may continuously detect the backside pattern along the media 100. In such examples, the sensor 60 may collect data continuously such that a plot of the intensity of light along the length of the media 100 may be generated. For example, the light response within a window, such as the window 125 of FIG. 2B may be measured.

At block 430, the processor 65 is to match the backside pattern measured during block 410 between measurements made during multiple passes of the media 100 relative to the printer assembly 55. The manner by which the processor 65 matches the pattern is not limited. For example, an image of the backside pattern within a field of view may be captured by a camera at the location in block 410. The processor 65 may then carry out an image analysis of the backside pattern between a measurement made during the first pass and a measurement during the second pass to determine the difference between the different passes to determine an offset between the passes.

At block 440, the controller 70 adjusts the media 100 relative to the printer assembly 55 based on the offset calculated or determined at block 430 so that the subsequent pass of the media 100 through the printer assembly 55 may be better aligned such that the markings on the front side 110 will be formed accurately and with higher quality. For example, the controller 70 may shift the media 100 by the offset determined at block 430 as the media 100 at the location at which the offset is determined. As another example, the controller 70 may adjust the timing of that the printer assembly 55 receives the content data such that the markings are offset when printing on a moving media 100. In other examples, translations such as skewing, compression, and stretching may also be accommodated.

Next, at block 450, the processor 65 is to match the backside pattern measured during block 420 (i.e. at the second location) between measurements made during multiple passes of the media 100 relative to the printer assembly 55. The manner by which the processor 65 matches the pattern is not limited and may include the same means as discussed above in connection with block 430.

At block 460, the controller 70 adjusts the media 100 relative to the printer assembly 55 based on the offset calculated or determined at block 450 so that the subsequent pass of the media 100 through the printer assembly 55 may be re-adjusted as it is passing through the printer assembly 55. For example, the controller 70 may shift the media 100 by the offset determined at block 450 as the media 100 at the location at which the offset is determined. It is to be appreciated, that by re-adjusting the media 100 subsequent to the first adjustment carried out at block 440, the apparatus 50 may correct for potential slippage of the media 100.

In other examples, such as when the sensor 60 continuous detects the backside patter, the sensor 60 may provide an index value related to the amount of light detected at each point. Accordingly, the, the sensor 60 may provide a plot of the intensity of light along the length of the media 100. In such examples, the entire plot of different passes may be compared and adjustments may be continuously made as the media 100 moves relative to the printer assembly 55.

Figure 6A:
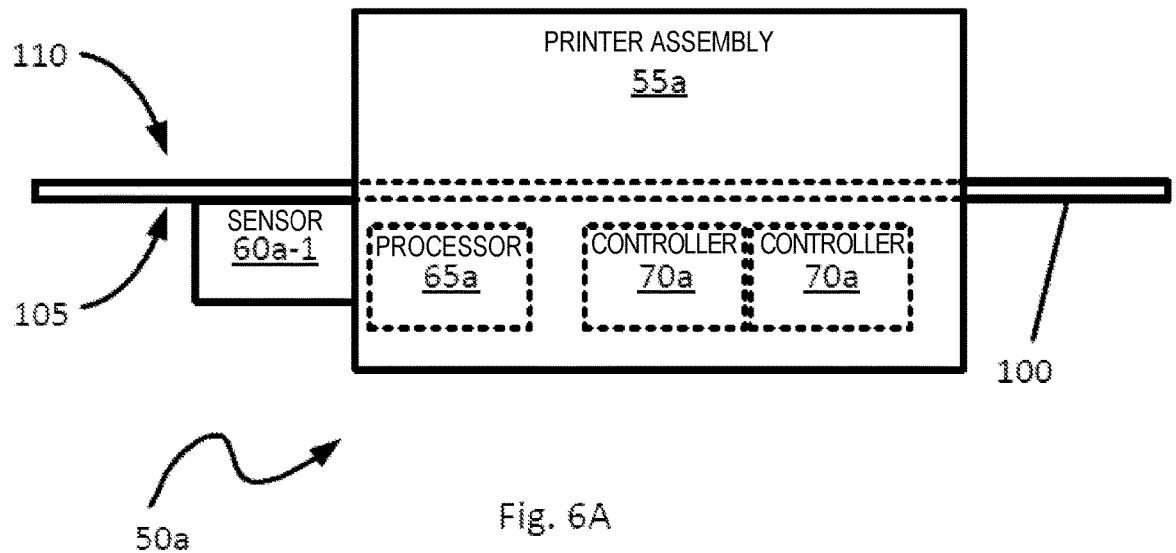
FIGS. 6A-B are side view diagrams of the apparatus of another example showing (a) a first side; and (b) a second side.
Figure 6B:
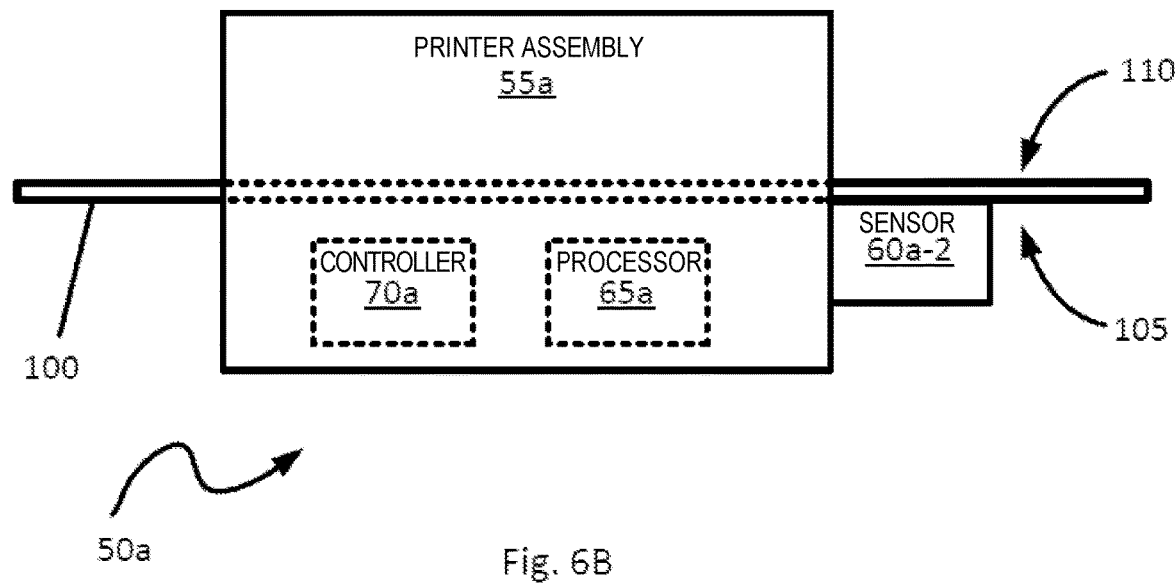

Referring to FIGS. 6A and 6B, another apparatus is generally shown at 50a. The apparatus 50a is to align media 100 passing through a printer assembly 55a multiple times to provide multiple passes for marking the media 100 on a front side 110. Like components of the apparatus 50a bear like reference to their counterparts in the apparatus 50, except followed by the suffix "a". In the present example, the apparatus 50a a printer assembly 55a, sensors 60a-1 and 60a-2, a processor 65a, and a controller 70a.

Figure 7:
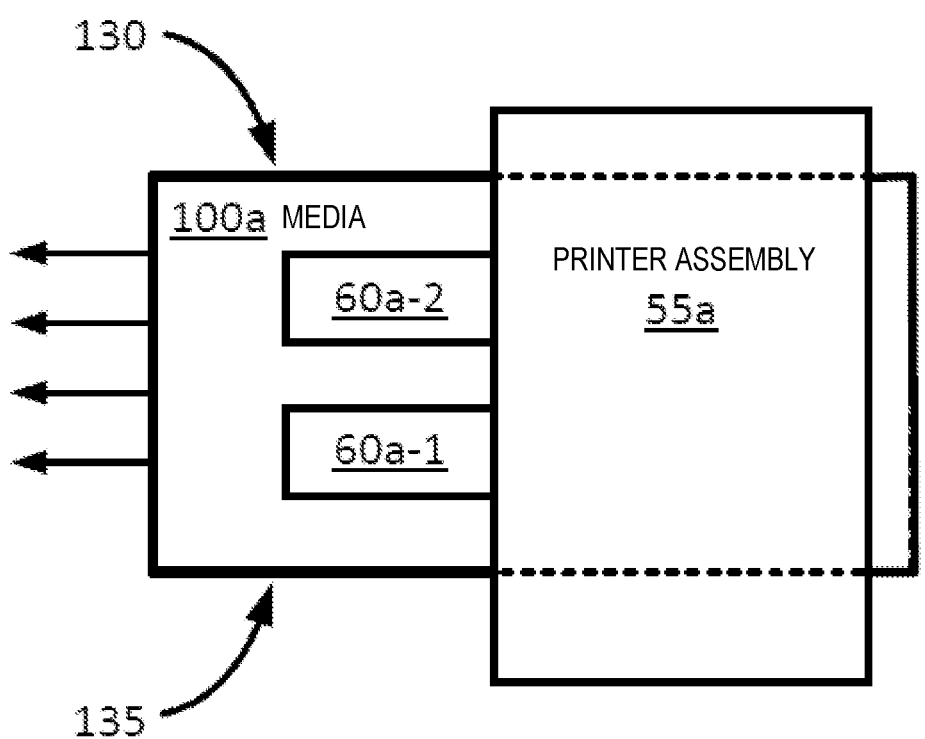
FIG. 7 is a top view diagrams of the apparatus.

The printer assembly 55a is to form markings on a media 100. The printer assembly 55a is not particularly limited and may operate substantially similar to the manner by which the printer assembly 55 operates. The printer assembly 55a further includes the ability to adjust a skew of the media 100 as it passes therethrough. Referring to FIG. 7, the printer assembly 55a may adjust the one edge of the media 100, such as the right side 130 in FIG. 7, independently of the left side 135. Accordingly, the media 100 may be skewed or tilted.

The sensors 60a-1 and 60a-2 (generically, these sensors are referred to herein as "sensor 60a" and collectively they are referred to as "sensors 60a", this nomenclature is used elsewhere in this description) are to detect a backside pattern on the backside 105 of the media 100. In the present example, the sensors 60a are disposed in at fixed positions relative to each other, such as shown in FIG. 7. The sensors 60a are to detect the backside pattern at multiple locations during each pass of the media 100 through the printer assembly 55a. For example, the sensors 60a may operate continuously along the media 100 to detect the backside pattern. In this example, the sensors 60a may collect data continuously to generate two plots of the intensity of light along the length of the media 100. In particular, the sensors 60a may measure the light response as media 100 is moved over the sensor 60a. Accordingly, the light response within a window may be measured.

The two plots measured by the sensors 60a may be used to track a skew of the media 100. For example, the feeding mechanism of the printer assembly 55a may move one edge of the media 100 at a slightly faster speed than the other. This may result in the media 100 skewing as it is passed through the printer apparatus. Furthermore, skewing may also be caused by random slippage events on either the right side 130 or the left side 135 of the media 100.

It is to be appreciated that the sensors 60a are not limited. For example, there are two sensors 60a positioned beside each other to track skew. In other examples, the sensors 60a may be located further apart and closer to the right side 130 or the left side 135. Other examples may also have more than two sensors to generate additional plots.

The processor 65a is in communication with the sensors 60a and is to receive signals from the sensors 60a. In the present example, the processor 65a compares the backside pattern of the media 100 measured by each sensor 60a during multiple passes of the media 100. The processor 65a compares the backside patterns of the media 100 to determine or calculate an offset between the first pass and the second pass continuously. In addition, but comparing the offsets, the processor 65a may also track a skew of the media. In particular, if the offset measured at the sensor 60a-1 changes at a different rate than at the sensor 60a-2, the media 100 is skewed. In the present example, continuously may mean an offset is calculated at multiple discrete points or locations that are close to each other.

The controller 70a is coupled with the processor 65a and is to control the printer assembly 55a or cause an adjustment of an attribute of the printer assembly 55a to address an offset or to correct a skew detected by the sensors 60a. In particular, the controller 70a is to adjust the media 100 relative to the printer assembly 55a so that a subsequent pass of the media 100 through the printer assembly 55a may be better aligned such that the markings on the front side 110 will be formed accurately and with higher quality. It is to be appreciated that this may provide an active deskewing process that may be corrected actively during each pass of the media 100 through the printer assembly.

It should be recognized that features and aspects of the various examples provided above may be combined into further examples that also fall within the scope of the present disclosure.

What is claimed is:

1. An apparatus comprising:
   a printer assembly to form markings on a first side of a media, wherein the printer assembly is to make a first pass and a second pass over the media;
   a first sensor to detect a backside pattern at a first location on a second side of the media and to detect the backside pattern at a second location on the second side of the media, wherein the second side of the media is opposite the first side of the media;
   a processor in communication with the first sensor, wherein the processor is to compare the backside pattern measured during the first pass and the backside pattern measured during the second pass at the first location to determine a first offset, and to compare the backside pattern measured during the first pass and the backside pattern measured during the second pass at the second location to determine a second offset; and
   a controller to control the printer assembly, wherein the controller is to adjust the media relative to the printer assembly based on the first offset at the first location and based on the second offset at the second location for the second pass over the media.

2. The apparatus of claim 1, wherein the first location and the second location are spaced at a substantially equal distance along the media.

3. The apparatus of claim 1, wherein the first sensor is to detect the backside pattern continuously along the media.

4. The apparatus of claim 3, wherein the controller is to adjust the media relative to the printer assembly continuously along the media.

5. The apparatus of claim 1, wherein the first sensor is to detect line pairs, and wherein the processor determines the first offset to match the line pairs detected on the first pass.

6. The apparatus of claim 1, further comprising a second sensor disposed at a fixed location relative to the first sensor, wherein the first sensor and the second sensor are to track skew.

7. The apparatus of claim 6, wherein the controller is to adjust the media relative to the printer assembly to correct the skew.

8. A method comprising:
  detecting a backside pattern at a first location;
  detecting the backside pattern at a second location, wherein the first location is at a first end of a media and the second location is at a midpoint of the media opposite the first end;
  matching the backside pattern measured during a first pass and the backside pattern measured during a second pass at the first location to determine a first offset;
  adjusting the media relative to a printer assembly by the first offset at the first location;
  matching the backside pattern measured during the first pass and the backside pattern measured during the second pass at the first location to determine a second offset; and
  re-adjusting the media relative to the printer assembly by the second offset at the second location.

9. The method of claim 8, wherein detecting the backside pattern comprises continuously detecting the backside pattern along the media.

10. The method of claim 9, wherein adjusting the media relative to the printer assembly comprises continuously adjusting along the media.

11. The method of claim 8, wherein detecting the backside pattern comprises detecting a pattern density.

12. A non-transitory machine-readable storage medium comprising instructions executable by a processor, the non-transitory machine-readable storage medium comprising:
  instructions to detect a backside pattern at a first location and at a second location during a first pass of a media;
  instructions to detect a backside pattern at the first location and at the second location during a second pass of a media;
  instructions to match the backside pattern measured during the first pass and the second pass at the first location to determine a first offset;
  instructions to adjust the media relative to a printer assembly at the first location based on the first offset;
  instructions to match the backside pattern measured during the first pass and the second pass at the second location to determine a second offset; and
  instructions to adjust the media relative to the printer assembly at the first location based on the first offset.

13. The non-transitory machine-readable storage medium of claim 12, comprising instructions to detect the backside pattern along the media continuously.

14. The non-transitory machine-readable storage medium of claim 13, comprising instructions to adjust the media relative to the printer assembly continuously.

15. The non-transitory machine-readable storage medium of claim 12, comprising instructions to detect a plurality of embedded logos.

* * * * *